(12) United States Patent
Kwon et al.

(10) Patent No.: US 12,437,701 B2
(45) Date of Patent: Oct. 7, 2025

(54) DISPLAY PANEL CONTROL APPARATUS AND METHOD

(71) Applicant: KORTEK CORPORATION, Incheon (KR)

(72) Inventors: Je Young Kwon, Anyang-si (KR); Min Hee Jung, Incheon (KR)

(73) Assignee: KORTEK CORPORATION, Incheon (KR)

( * ) Notice: Subject to any disclaimer, the term of this patent is extended or adjusted under 35 U.S.C. 154(b) by 0 days.

(21) Appl. No.: 18/574,117

(22) PCT Filed: Aug. 6, 2021

(86) PCT No.: PCT/KR2021/010438
§ 371 (c)(1),
(2) Date: Dec. 26, 2023

(87) PCT Pub. No.: WO2023/013800
PCT Pub. Date: Feb. 9, 2023

(65) Prior Publication Data
US 2024/0321175 A1 Sep. 26, 2024

(51) Int. Cl.
*G06F 3/041* (2006.01)
*G09G 3/20* (2006.01)

(52) U.S. Cl.
CPC ......... *G09G 3/2096* (2013.01); *G06F 3/0412* (2013.01); *G09G 2300/026* (2013.01); *G09G 2340/0492* (2013.01); *G09G 2354/00* (2013.01); *G09G 2356/00* (2013.01); *G09G 2360/04* (2013.01)

(58) Field of Classification Search
CPC ........... G09G 3/2096; G09G 2300/026; G09G 2340/0492; G09G 2354/00; G09G 2356/00; G09G 2360/04; G06F 3/0412
See application file for complete search history.

(56) References Cited

U.S. PATENT DOCUMENTS

| | | | |
|---|---|---|---|
| 6,236,446 B1 | 5/2001 | Izumi et al. | |
| 2010/0302179 A1* | 12/2010 | Ahn | H04M 1/72403 345/173 |
| 2014/0029017 A1* | 1/2014 | Lee | G06F 1/1652 356/601 |
| 2015/0370112 A1 | 12/2015 | Sawabe | |
| 2017/0004803 A1 | 1/2017 | Bostick et al. | |
| 2017/0032737 A1* | 2/2017 | Lee | H10K 77/111 |

(Continued)

FOREIGN PATENT DOCUMENTS

| | | |
|---|---|---|
| JP | 2007-322747 A | 12/2007 |
| KR | 10-2011-0103171 A | 9/2011 |

(Continued)

OTHER PUBLICATIONS

International Search Report for PCT/KR2021/010438, mailed on May 4, 2022.

*Primary Examiner* — Towfiq Elahi
(74) *Attorney, Agent, or Firm* — Schreiser, Olsen & Watts LLP

(57) ABSTRACT

A display panel control apparatus is provided including: two display panels (DP1, DP2) formed by physically cutting a single display panel into left and right sides; and an image processing unit which outputs an image to each of the physically cut display panels (DP1, DP2).

11 Claims, 14 Drawing Sheets

(56) References Cited

U.S. PATENT DOCUMENTS

| | | | |
|---|---|---|---|
| 2018/0031879 A1 | 2/2018 | Siddiqui et al. | |
| 2020/0073619 A1* | 3/2020 | Huang | G06F 3/1446 |
| 2021/0088863 A1* | 3/2021 | Ha | G06F 1/1652 |

FOREIGN PATENT DOCUMENTS

| | | |
|---|---|---|
| KR | 10-2012-0075101 A | 7/2012 |
| KR | 10-2016-0141231 A | 12/2016 |
| KR | 101727664 B1 | 4/2017 |
| KR | 10-2017-0093832 | 8/2017 |
| KR | 20180001013 A | 1/2018 |
| KR | 20180024501 A | 3/2018 |
| KR | 10-2018-0074334 A | 7/2018 |
| KR | 10-2019-0053264 | 5/2019 |
| KR | 10-2020-0025619 A | 3/2020 |

* cited by examiner

DISPLAY PANEL CONTROL APPARATUS AND METHOD

CROSS-REFERENCE TO RELATED APPLICATIONS

This application claims priority to PCT Application No. PCT/KR2021/010438, having a filing date of Aug. 6, 2021, the entire contents of which are hereby incorporated by reference.

FIELD OF TECHNOLOGY

The following relates to a display panel control device and method, and more specifically, to a display panel control device capable of cutting a single display panel into right and left sides to physically divide the display panel into a plurality of display panels, and then respectively displaying images on the divided display panels and continuously displaying image data in response to relative positions and postures of the divided display panels, and a display panel control method.

BACKGROUND

Recently, various types of display devices are implemented in forms desired by users by processing one or several display panels.

For example, when one display panel is excessively bent to be processed into a desired form, since there is a risk of damage to the display panel, a display device in the form desired by the user is generally implemented by arranging several display panels.

However, when one display device is implemented by arranging several display panels as described above, a problem in that images are discontinuously displayed due to an edge portion of each arranged display panel occurs, and a problem in that a separate driving circuit is additionally required for each display panel occurs.

Generally, a display panel (for example, a liquid crystal display panel) includes an array substrate to which control signals for a plurality of pixel electrodes are applied through signal lines, and a counter substrate facing the array substrate. The pixel electrodes are disposed in a matrix form in a display region of the array substrate.

A liquid crystal layer in which orientation of liquid crystals is adjusted by an electric field generated from the control signals may be disposed between the array substrate and the counter substrate.

The conventional art is disclosed in Korean Laid-Open Patent No. 10-2016-0141231 (published on Dec. 8, 2016, Display device and method for driving the same).

SUMMARY

An aspect relates to a display panel control device capable of cutting a single display panel into right and left sides to physically divide the display panel into a plurality of display panels, and then respectively displaying images on the divided display panels and continuously displaying image data in response to relative positions and postures of the divided display panels, and a display panel control method.

A display panel control device according to one aspect of embodiments of the present invention includes: two display panels (DP1 and DP2) generated by physically cutting a single display panel into right and left sides; and an image processing unit configured to output images to each of the physically cut display panels (DP1 and DP2).

In embodiments of the present invention, the single display panel may include a display panel including at least two pairs of source drivers and gate drivers so that the display panel may be divided into right and left regions and each region may be driven.

In embodiments of the present invention, the display panel may include a gate in panel (GIP) type display panel including a gate driver therein.

In embodiments of the present invention, a right and left cutting ratio of a cutting position of the display panel may be adjusted in response to configurations or positions of the source drivers and the gate drivers.

In embodiments of the present invention, cut portions of the cut display panels (DP1 and DP2) may be disposed adjacent to each other so that a region where a screen is not displayed (BM: black mask) may be reduced to allow a slim design when the cut display panels (DP1 and DP2) are implemented as one display device.

In embodiments of the present invention, the image processing unit may output a normal image for each display panel in a manner of adjusting positions of the images through the image processing unit when the cut display panels (DP1 and DP2) are separately used.

In embodiments of the present invention, when the cut display panels (DP1 and DP2) are disposed adjacent to each other and implemented as one display device, different curvatures may be applied to each of the display panels (DP1 and DP2) to be physically implemented as various types of display devices.

In embodiments of the present invention, when the cut display panels (DP1 and DP2) are disposed adjacent to each other and implemented as one display device, in order to reduce components compared to a case in which a display device is implemented using a plurality of uncut display panels, the image processing unit may control the cut display panels (DP1 and DP2) by commonly using components included in one uncut display panel cut into the cut display panels (DP1 and DP2).

In embodiments of the present invention, the image processing unit may be implemented in a form of a board provided with a scaler.

In embodiments of the present invention, a touch film which is not physically separated, may be attached to an upper portion of each of the display panels (DP1 and DP2), and the display panel control device may further include one touch signal processing unit configured to detect and process a touch on each of the display panels (DP1 and DP2) through the touch film, which is not physically separated.

In embodiments of the present invention, the image processing unit may process the images in response to a relative position and a posture on the basis of a cut surface of each of the display panels (DP1 and DP2) according to control of a controller.

In embodiments of the present invention, the display panel control device may further include a sensor unit composed of a plurality of sensors configured to detect the relative position and the posture of each of the display panels (DP1 and DP2), wherein the controller may process the images to be output on the basis of the relative position and the posture of each of the display panels (DP1 and DP2) detected through the sensor unit.

In embodiments of the present invention, the controller may check whether the cut surfaces of the two display panels (DP1 and DP2) cut from the single display panel are separated and spaced apart at a specific interval, and detect a tilt of each of the display panels (DP1 and DP2) which are separated and spaced apart from each other and a distance between upper and lower corners through the sensor unit, and may rotate the image to be displayed on each of the separated display panels (DP1 and DP2) in response to each tilt when the images to be displayed on the display panels (DP1 and DP2), which are separated and spaced apart from each other, are continuous images that are continuously displayed.

In embodiments of the present invention, when the two display panels (DP1 and DP2) cut from the single display panel partially overlap at upper and lower sides, the controller may calculate a shape and an area of an overlapping portion, and distinguish the overlapping upper display panel and lower display panel through the sensor unit.

In embodiments of the present invention, the controller may calculate the shape and the area of the overlapping portion of the display panels (DP1 and DP2) overlapping at the upper and lower sides on the basis of location information where the sensors of the sensor unit are attached, length information of the cut surface of each of the display panels (DP1 and DP2), tilt information of each of the display panels (DP1 and DP2), and relative position or distance information between the sensors attached to at least upper and lower sides of each corner.

In embodiments of the present invention, the controller may display an image displayed on a hidden portion in the lower display panel in addition to a front portion of an image displayed on the upper display panel when the shape and the area of the overlapping portion of the display panels (DP1 and DP2) overlapping at the upper and lower sides are calculated.

A display panel control method according to another aspect of embodiments of the present invention includes: controlling, by an image processing unit, display panels (DP1 and DP2) physically cut from a single display panel; and displaying, by the image processing unit, an image on each of the display panels (DP1 and DP2).

In embodiments of the present invention, the single display panel may include a display panel including at least two pairs of source drivers and gate drivers so that the display panel may be divided into right and left regions and each region may be driven.

In embodiments of the present invention, a touch film which is not physically separated, may be attached to an upper portion of each of the display panels (DP1 and DP2), and one touch signal processing unit may detect and process a touch on each of the display panels (DP1 and DP2) through the touch film which is not physically separated.

In embodiments of the present invention, in order to display the image to be displayed on each of the display panels (DP1 and DP2), the display panel control method may include: checking, by a controller, whether cut surfaces of the two display panels (DP1 and DP2) cut from the single display panel into right and left sides are separated and spaced apart from each other through a sensor unit; detecting, by the controller, a tilt of each of the separated display panels (DP1 and DP2) and a distance between upper and lower corners; calculating, by the controller, a relative position and a posture on the basis of a cut surface of each of the display panels (DP1 and DP2) using information on the tilt and distance between the upper and lower corners; and processing, by the controller, each image to be displayed in response to the relative position and the posture of each of the display panels (DP1 and DP2).

In embodiments of the present invention, in the processing of each image to be displayed in response to the relative position and the posture of each of the display panels (DP1 and DP2), the method may further include rotating, by the controller, the image to be displayed on each of the separated display panels (DP1 and DP2) in response to each tilt through the image processing unit when the images to be displayed on the separated display panels (DP1 and DP2) are images that are continuously displayed.

In embodiments of the present invention, in order to process each image to be displayed, the controller may calculate a shape and an area of an overlapping portion in the case in which the display panels partially overlap at upper and lower sides, and distinguish the overlapping upper display panel and lower display panel.

In embodiments of the present invention, in order to calculate the shape and the area of the overlapping portion, the controller may calculate the shape and the area of the overlapping portion of the display panels (DP1 and DP2) overlapping at the upper and lower sides on the basis of location information where the sensors of the sensor unit are attached, length information of the cut surface of each of the display panels (DP1 and DP2), tilt information of each of the display panels (DP1 and DP2), and relative position or distance information between sensors attached to at least upper and lower sides of each corner.

In embodiments of the present invention, the controller may display an image displayed on a hidden portion in the lower display panel in addition to a front portion of an image displayed on the upper display panel when the shape and the area of the overlapping portion are calculated.

According to one aspect of embodiments of the present invention, there is an effect in that a single display panel can be cut into right and left sides to physically divide the display panel into a plurality of display panels, and then images can be respectively displayed on the divided display panels, and the images respectively displayed on display panels DP1 and DP2 in response to relative positions and postures of the divided display panels are displayed in a straight manner without tilting while being displayed to be connected and not discontinuous.

BRIEF DESCRIPTION

Some of the embodiments will be described in detail, with references to the following Figures, wherein like designations denote like members, wherein.

DETAILED DESCRIPTION

Figure 1A:
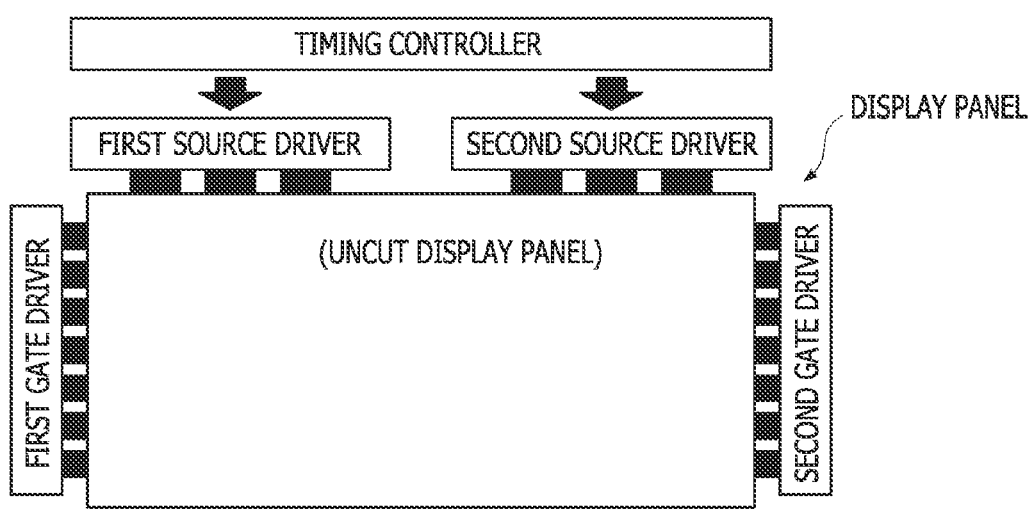
FIG. 1A is an exemplary diagram for describing a reason and method of using a display panel by cutting the display panel into right and left sides in relation to one embodiment of the present invention.

Hereinafter, one embodiment of a display panel control device and method according to the present invention will be described with reference to the accompanying drawings.

In this process, a thickness of lines, sizes of components, or the like shown in the drawings may be exaggerated for clarity and convenience of description. Further, terms to be described below are terms defined in consideration of functions in embodiments of the present invention, and thus may be changed according to the intentions or customs of users and operators.

Accordingly, definition of these terms should be made based on the content throughout the present specification.

Recently, display panels having ultra-high definition (UHD; definition of 3840×2160) have been released.

In this case, in the embodiment, it should be noted that the ultra-high definition display panel (for example, a liquid crystal display panel) is only an example described for convenience of description, and is not intended to limit embodiments of the present invention.

Embodiments of the present invention relate to physically cutting a display panel, and respectively outputting different images on the physically cut display panels when a driving circuit of a single display panel (for example, a liquid crystal display panel) is composed of at least two pairs so that right and left (or upper and lower) regions of the display panel can be separated and driven as shown in FIG. 1A.

Referring to FIG. 1A, gate drivers (a first gate driver and a second gate driver) are provided at right and left sides of a single display panel, source drivers (a first source driver and a second source driver) are provided at right and left sides of an upper portion, and one timing controller, which controls the plurality of source drivers (the first source driver and the second source driver), is provided.

Figure 1B:
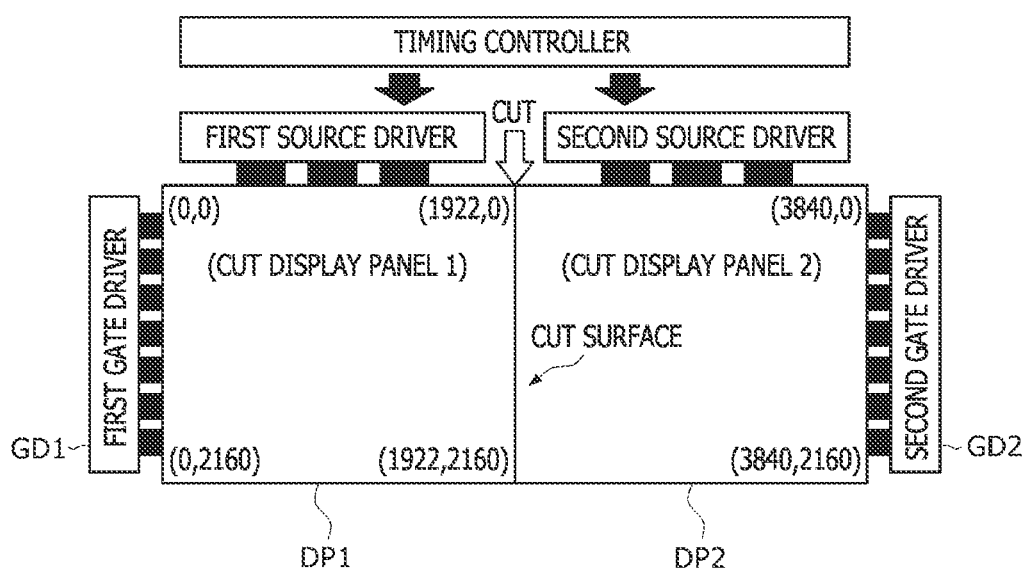
FIG. 1B is the embodiment shown in FIG. 1A physically cut to divide the display panel into two display panels DP1 and DP2 physically separated into right and left (up and down) sides.

Accordingly, in embodiments of the present invention, a center of the single display panel implemented as shown in FIG. 1A is physically cut to divide the display panel into two display panels DP1 and DP2 physically separated into right and left (up and down) sides as shown in FIG. 1B.

Hereinafter, the reason why the single display panel should be divided into the two display panels DP1 and DP2 will be described.

Figures 2A, 2B, 2C, 2D:
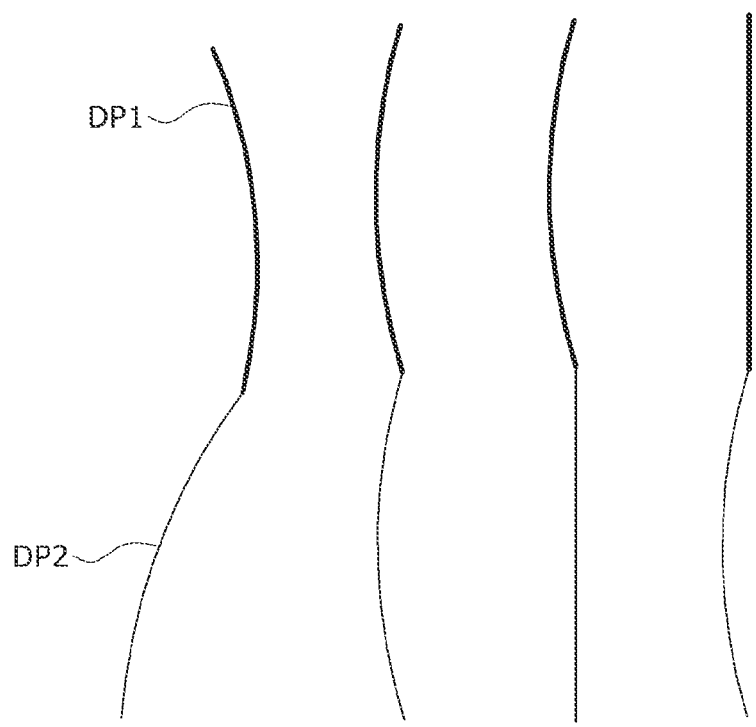
FIG. 2A is an exemplary diagram illustrating a side-sectional surface shape in the case in which two display panels are disposed and processed into a display device of a desired form in FIG. 1.
FIG. 2B is an exemplary diagram illustrating a side-sectional surface shape in the case in which two display panels are disposed and processed into a display device of a desired form in FIG. 1.
FIG. 2C is an exemplary diagram illustrating a side-sectional surface shape in the case in which two display panels are disposed and processed into a display device of a desired form in FIG. 1.
FIG. 2D is an exemplary diagram illustrating a side-sectional surface shape in the case in which two display panels are disposed and processed into a display device of a desired form in FIG. 1.

FIG. 2 is an exemplary diagram illustrating a side-sectional surface shape in the case in which two display panels are disposed and processed into a display device of a desired form in FIG. 1, and when various types of display devices shown in FIGS. 2A to 2D are implemented, since the various forms cannot be implemented using only one display panel, conventionally, two display panels should be disposed.

However, when two display panels are disposed as described above, a display device in a form desired by a user may be implemented, but there is a problem in that two display panels should be purchased and thus economic costs increase, and a region where a screen of the display device is not displayed (BM: black mask region) is widened.

Accordingly, there is a need for a method capable of implementing various types of display devices as shown in FIG. 2, and downsizing a region where the screen of the display device is not displayed while reducing costs compared to the conventional art.

Accordingly, in embodiments of the present invention, as shown in FIG. 1A, as the display panel composed of at least two driving circuits (for example, a source driver and a gate driver) is physically cut into right and left sides (for example, cut at various ratios such as 1/2, 1/3, 1/4, 2/5, and the like) so that the driving circuits of the single display panel (for example, a liquid crystal display panel) may respectively drive divided regions after the display panel is divided into the right and left regions, the various types of display devices shown in FIG. 2 may be implemented while downsizing the region where the screen is not displayed compared to the conventional art by arranging each physically cut display panel, and different images may be respectively output to the physically cut display panels.

When the single display panel is physically cut as described above and disposed in the desired form and used, as an edge interval between cut surfaces is minimized, there is an advantage in that an interval between discontinuous portions of the image generated due to edge portions respectively included in display panels when two existing display panels are disposed (that is, an interval between the portions where two display panels of a single product are disposed is widened and the image is discontinuously displayed) may be reduced.

In other words, in embodiments of the present invention, when one single display panel is cut into right and left sides as described above, as shown in FIGS. 2A to 2D, there is an advantage in that the user may easily implement a display device of a desired form by arranging each of the physically cut display panels DP1 and DP2 with a curvature of the desired form.

Figure 11A:
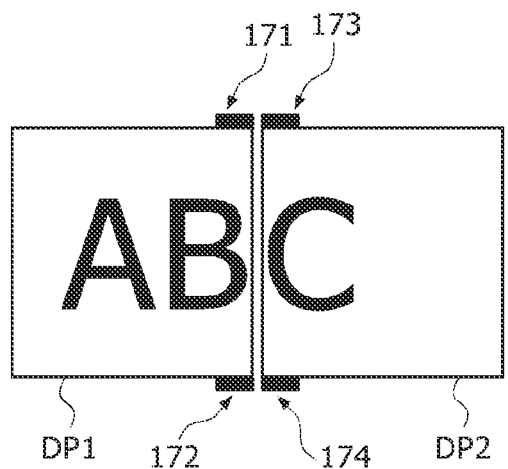
FIG. 11A is an exemplary diagram illustrating a form in which divided display panels are disposed when two divided display panels are disposed and processed into the display device of a desired form in FIG. 3.
Figure 11B:
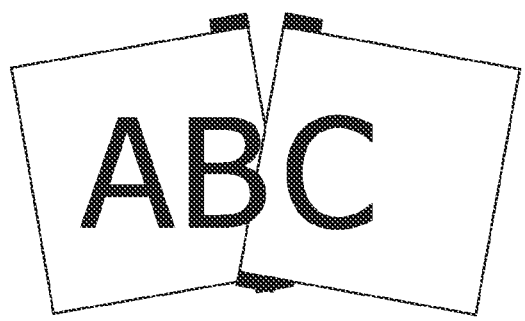
FIG. 11B is an exemplary diagram illustrating a form in which divided display panels are disposed when two divided display panels are disposed and processed into the display device of a desired form in FIG. 3.
Figure 11C:
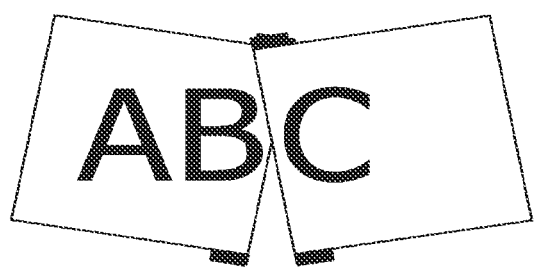
FIG. 11C is an exemplary diagram illustrating a form in which divided display panels are disposed when two divided display panels are disposed and processed into the display device of a desired form in FIG. 3.
Figure 11D:
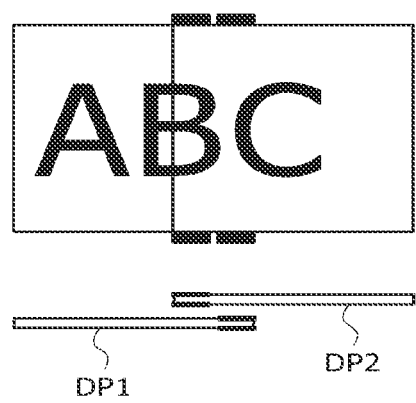
FIG. 11D is an exemplary diagram illustrating a form in which divided display panels are disposed when two divided display panels are disposed and processed into the display device of a desired form in FIG. 3.

Further, in embodiments of the present invention, when the physically cut display panels DP1 and DP2 are connected, according to the form desired by the user, as shown in FIGS. 11B to 11D, the display panels DP1 and DP2 may be implemented in a form of partially overlapping each other.

However, a problem arises in that the image displayed on a lower display panel (for example, DP1) is obscured by an upper display panel (for example, DP2) and thus is not visible as the display panels DP1 and DP2 partially overlap. Further, when each of the overlapping display panels DP1 and DP2 is tilted (see FIGS. 11B and IC), a problem arises in that the image displayed on each of the display panels DP1 and DP2 also appears tilted.

That is, even when the display panels DP1 and DP2 are disposed to overlap at a specific inclination (slope) in accordance with a design of the display device, a desirable display method that does not cause inconvenience to the user is a scheme in which the image shown to the user is displayed in a straight manner in a horizontal (or vertical) direction. However, in the existing display device, only an arrangement form of a plurality of display panels is considered, and the occurrence of a problem in that the image displayed on each of the display panels DP1 and DP2 is also tilted or obscured and thus causes inconvenience to the user when the display panels DP1 and DP2 to be disposed are tilted (inclined) or overlapped is not considered at all.

Accordingly, in embodiments of the present invention, when the physically cut display panels DP1 and DP2 are disposed and processed into a display device of a desired form, in consideration of the arrangement form (that is, a relative arrangement position and an inclined posture of each display panel), an image of a portion hidden in the lower display panel (for example, DP1) is displayed continuously on the upper display panel (for example, DP2) even when the lower display panel (for example, DP1) is obscured by the upper display panel (for example, DP2), and the image displayed on each of the display panels DP1 and DP2 is displayed in a straight manner without tilting even when each of the display panels DP1 and DP2 is tilted.

Figure 3:
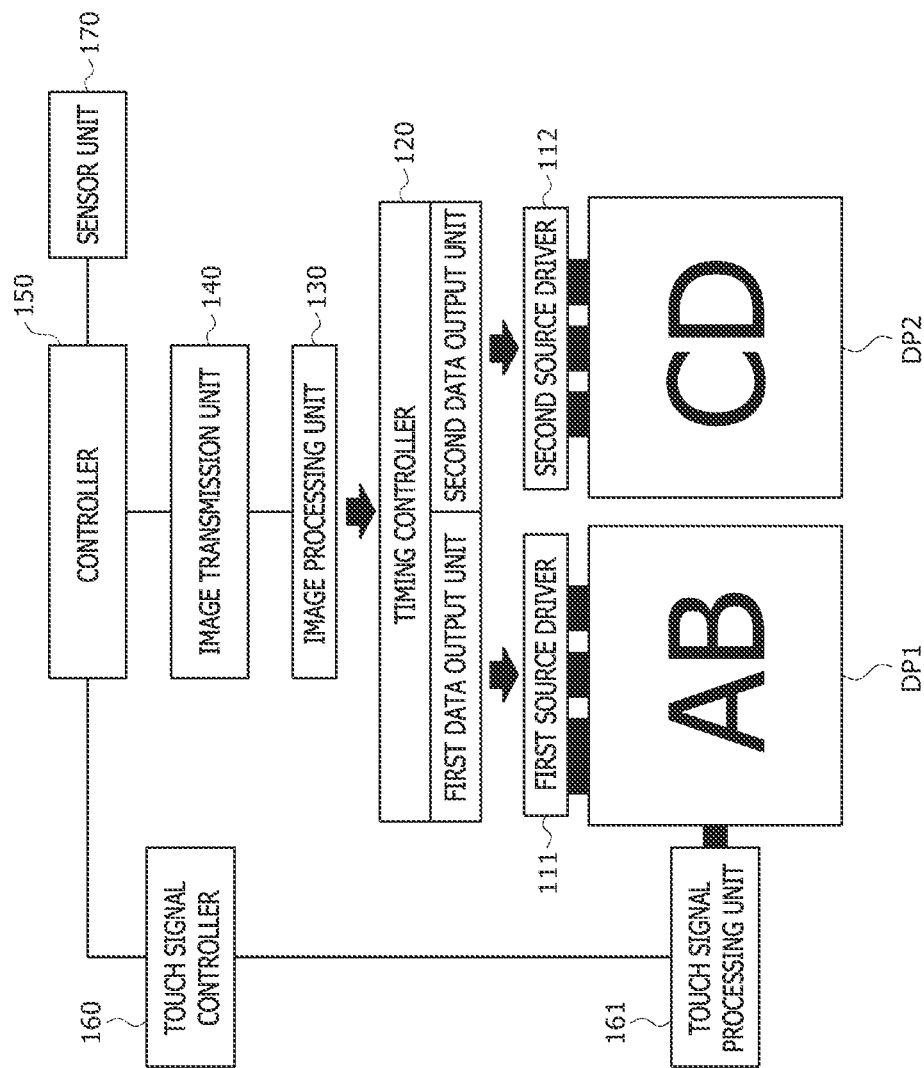
FIG. 3 is an exemplary diagram illustrating a schematic configuration of a display panel control device according to one embodiment of the present invention.

FIG. 3 is an exemplary diagram illustrating a schematic configuration of a display panel control device according to one embodiment of the present invention.

Referring to FIG. 3, the display panel control device according to one embodiment of the present invention includes two display panels DP1 and DP2 physically separated by cutting a single display panel (hereinafter, the display panel refers to display panels) right and left, a timing controller 120 that controls the timing at which data is output to each of source drivers 11I and 112 of the display panels DP1 and DP2, an image processing unit 130 that divides and processes images to be respectively provided to the display panels DP1 and DP2 through the timing controller 120, an image transmission unit 140 that receives images from a controller 150 and transmits the images to the image processing unit 130, the controller 150 that generates images processed in response to the relative position and the posture of each of the display panels DP1 and DP2, a sensor unit 170 (171 to 174 in FIG. 11) that detects the relative position and the posture of each of the display panels DP1 and DP2, and a touch signal processing unit 161 that processes touch signals through each of the display panels DP1 and DP2.

The touch signal processing unit 161 is controlled by a touch signal controller 160.

Further, hereinafter, in the embodiment, for convenience of description, the controller 150 is described as controlling the image processing unit 130, but the image processing unit 130 may include functions of the controller 150, and, in practice, the image processing unit 130 may control an image output to each of the display panels DP1 and DP2.

In this case, the image processing unit 130 may be implemented in a form of a board provided with a scaler.

In this case, although not shown in the drawing for convenience, as shown in FIG. 1, it should be noted that the gate drivers (the first gate driver and the second gate driver) are respectively included in the cut display panels DP1 and DP2.

Further, although not specifically shown in FIG. 3, a touch film (not shown), which is not physically separated, is attached to upper portions of the display panels DP1 and DP2, and accordingly, even when the display panels DP1 and DP2 are physically separated, a touch on the cut display panels DP1 and DP2 is detected and processed by the touch film (not shown), which is not physically separated, and the one touch signal processing unit 161.

Accordingly, as shown in the drawing, in embodiments of the present invention, since two separate and divided (or cut) display panels DP1 and DP2 are generated by physically cutting a display panel (an uncut display panel), which is originally one piece, the two separate and divided display panels DP1 and DP2 are driven using one (or one set) driving circuit (for example, the image processing unit, timing controller, source driver, touch signal processing unit, or the like), included in the single display panel (the uncut display panel), which is originally one piece, as it is.

Accordingly, there is an effect in that the unit cost of components can be reduced compared to when the display device is implemented using two display panels (uncut display panels).

Figure 4:
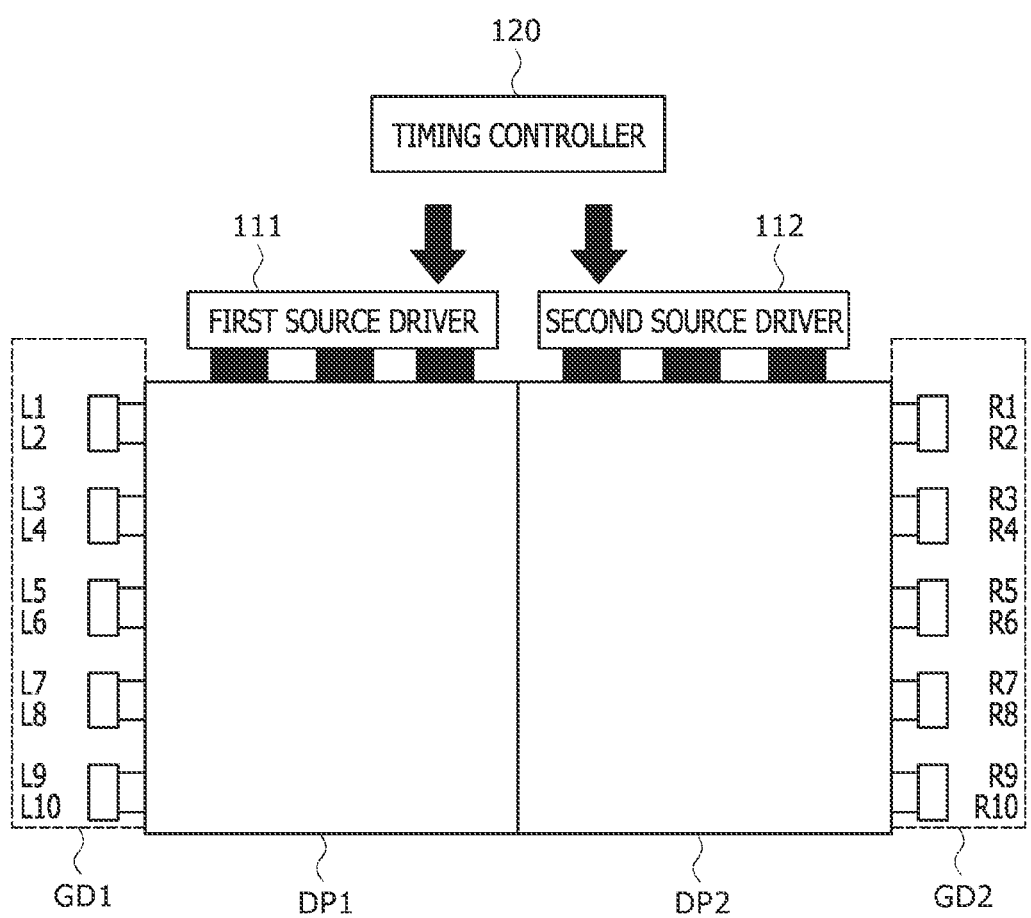
FIG. 4 is an exemplary diagram for describing a display panel having independent right and left control regions related to one embodiment of the present invention.
Figure 5:
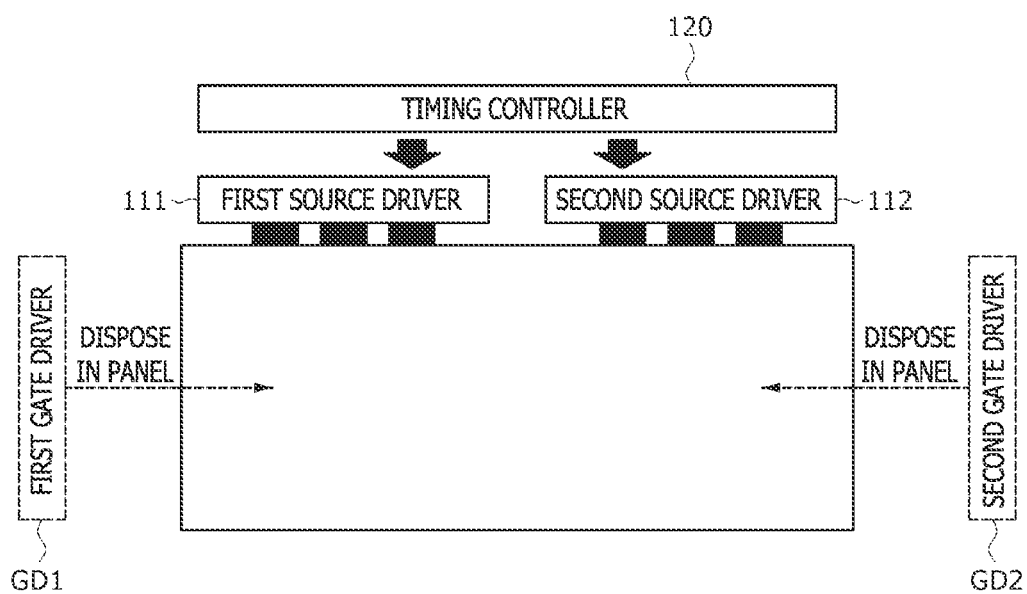
FIG. 5 is an exemplary diagram for describing a case in which gate drivers are disposed in the panel in FIG. 4.

FIG. 4 is an exemplary diagram for describing the display panel having independent right and left control regions related to one embodiment of the present invention, and FIG. 5 is an exemplary diagram for describing a case in which gate drivers are disposed in the panel in FIG. 4.

As shown in FIGS. 4 and 5, the display panel related to the embodiment includes two pairs of source drivers 111 and 112 and gate drivers GD1 and GD2, and accordingly, as the display panel is cut into right and left sides, both right and left regions may be used.

In this case, it is desirable to cut vertically based on the source drivers 111 and 112, and in this case, the resolution is not limited to the center and may be arbitrarily changed by the user as needed.

However, since there are various connected circuit components on a printed circuit board (PCB) of the source drivers 111 and 112, the PCB may not be cut.

Meanwhile, FIGS. 4 and 5 exemplarily describe an embodiment of using a display panel including two pairs of source drivers 111 and 112 and gate drivers GD1 and GD2, but embodiments of the present invention is not limited thereto, and may be equally applied to a display panel having a plurality of regions, which may be independently driven.

Further, in the exemplified display panel, although the gate drivers GD1 and GD2 are disposed at the outside of the panel, as shown in FIG. 5, at least one gate driver GD1 and/or GD2 may be disposed in the panel. This method is commonly referred to as gate in panel (GIP). That is, in the embodiment, a gate in panel (GIP) type display panel may also be used.

Figure 6:
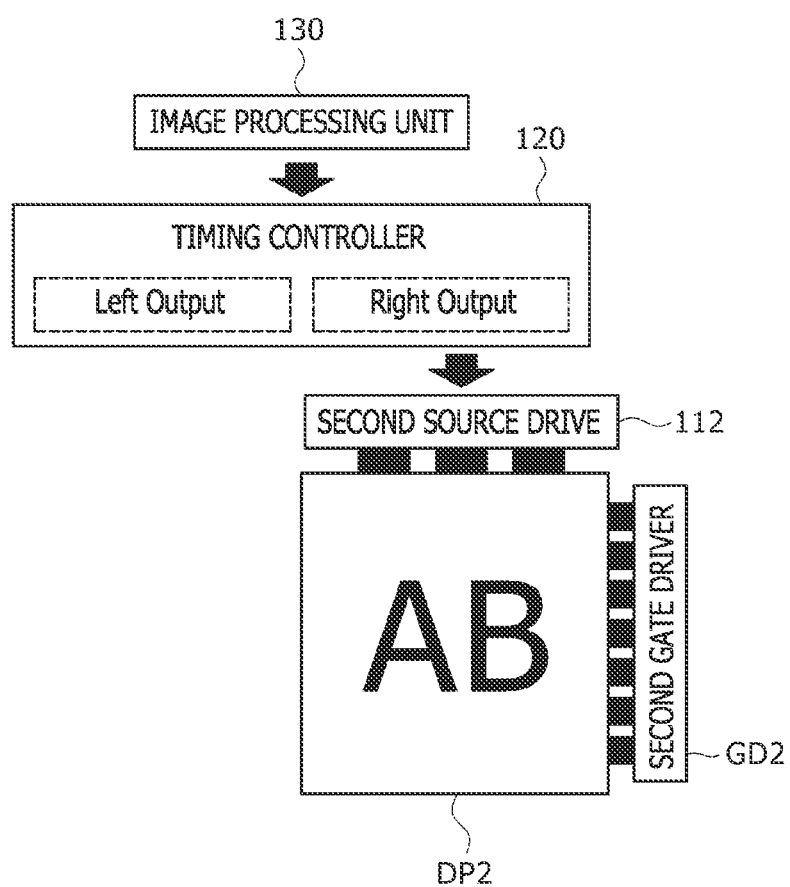
FIG. 6 is an exemplary diagram for describing a case in which a content image is displayed only on a cut single display panel after cutting the display panel in one embodiment of the present invention.

FIG. 6 is an exemplary diagram for describing a case in which a content image is displayed only on one cut display panel after cutting the display panel in one embodiment according to the present invention, and when the image processing unit 130 transmits a content image (or data) having the same resolution as a case before cutting to one cut display panel (for example, DP1) with an input of the timing controller 120 after cutting the display panel, a problem arises in that a black screen is displayed on the other cut display panel (for example, DP2).

Accordingly, in the embodiment, the image processing unit 130 outputs image content regardless of whether the right and left display panels are present, outputs an image having the same resolution as the existing case to the left display panel (for example, DP1) from the timing controller 120 as it is, and captures only an image corresponding to a size of the right display panel (for example, DP2) from the image output to the left display panel (for example, DP1) and outputs the captured image to the right display panel (for example, DP2) from the timing controller 120, and the image may be normally displayed on each of the cut display panels DP1 and DP2 by processing the images in a method of changing a starting point according to a starting point in the case of outputting the image to the right display panel (for example, DP2) (for example, starting pixel coordinates of the right display panel).

In other words, in the embodiment, when the image is output to each of the two cut display panels DP1 and DP2, the image processing unit 130 does not generate independent images to be output, but captures an image of a required region in one original image, and adjusts a position (that is, a starting point) of the captured image so that the image may be output to the corresponding display panel (for example, DP2).

However, this is one embodiment, the image processing unit 130 may generate images to be output to the two cut display panels DP1 and DP2, respectively, and the image to be output to the first display panel DP1 may be equally output to the second display panel DP2.

Meanwhile, as described above, when making various types of display devices using one display panel (uncut display panel), there are physical limitations in curvature implementation.

For example, conventionally, various types of display devices have been made by etching and thinning the display panels and then bending the display panels, but there was a limitation to the curvature that could be implemented due to the risk of the display panel breaking. That is, when two or more display panels (uncut display panels) are used, there was a problem in that a separate image processing unit was required to drive each of the display panels (uncut display panels), and non-image regions of regions adjacent to the two display panels are widened due to a non-image display region of each of the display panels (uncut display panels).

Figure 7:
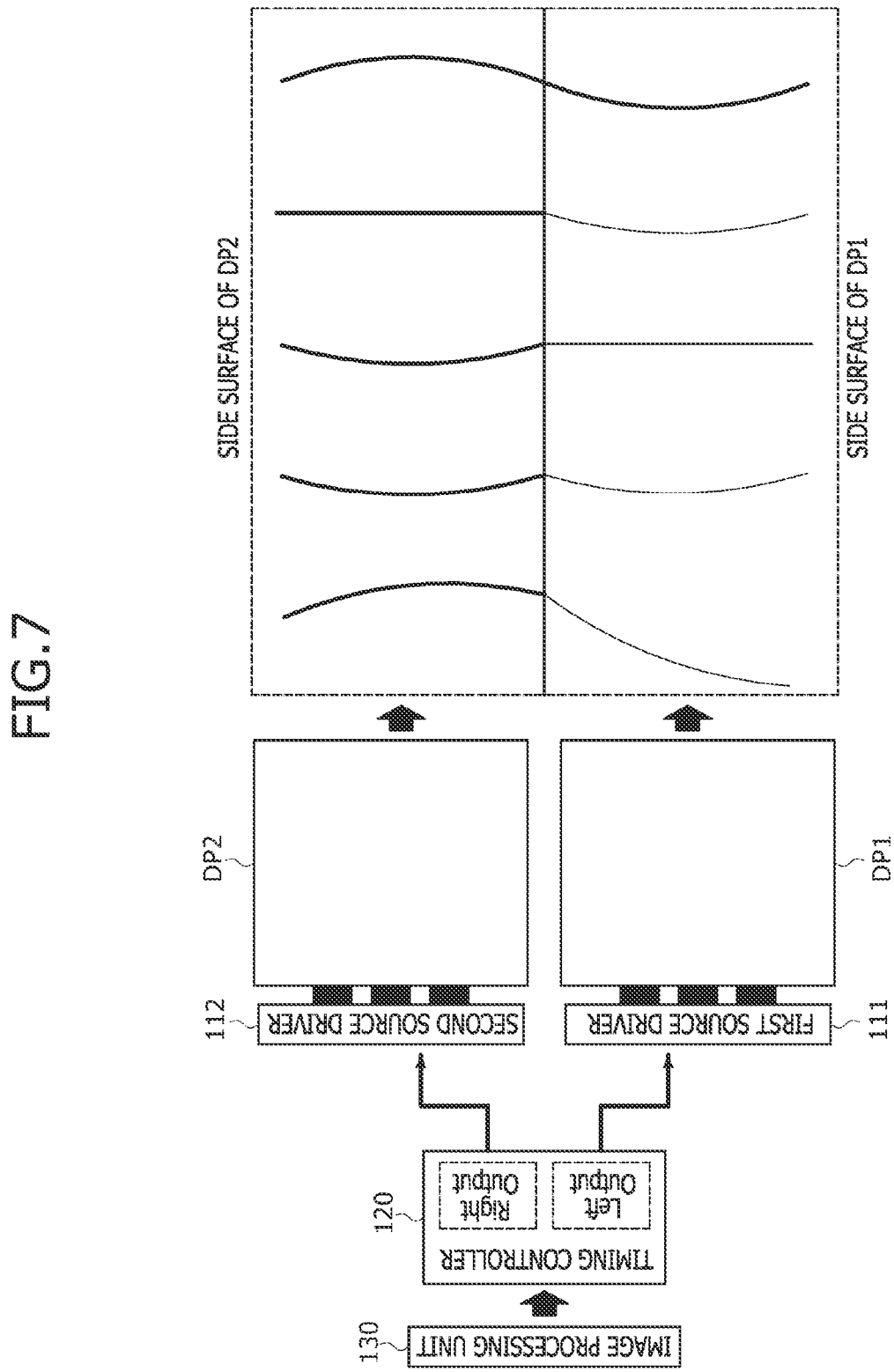
FIG. 7 is an exemplary diagram for describing a method of cutting one large display panel, and then making and disposing each cut display panel in a desired form to implement various types of display devices according to one embodiment of the present invention.

However, in the embodiment, as shown in FIG. 7, when a single large display panel is cut, and then each of the cut display panels DP1 and DP2 is made in desired forms (for example, with desired curvatures), and disposed adjacent to each other to be finished as one device, there is an effect in that the two display panels DP1 and DP2 can be controlled by one image processing unit 130, various curvatures can be easily implemented, and non-image regions of adjacent portions of the two display panels DP1 and DP2 can be minimized. The reason is that there is a non-image region of each of the two display panels DP1 and DP2 when two uncut display panels are used, but there are no data lines and electrostatic discharge circuits in the adjacent portions and thus cut portions include only very small non-image display regions when a single display panel is cut and the cut display panels are disposed adjacent to each other as shown in FIG. 7.

Figure 8:
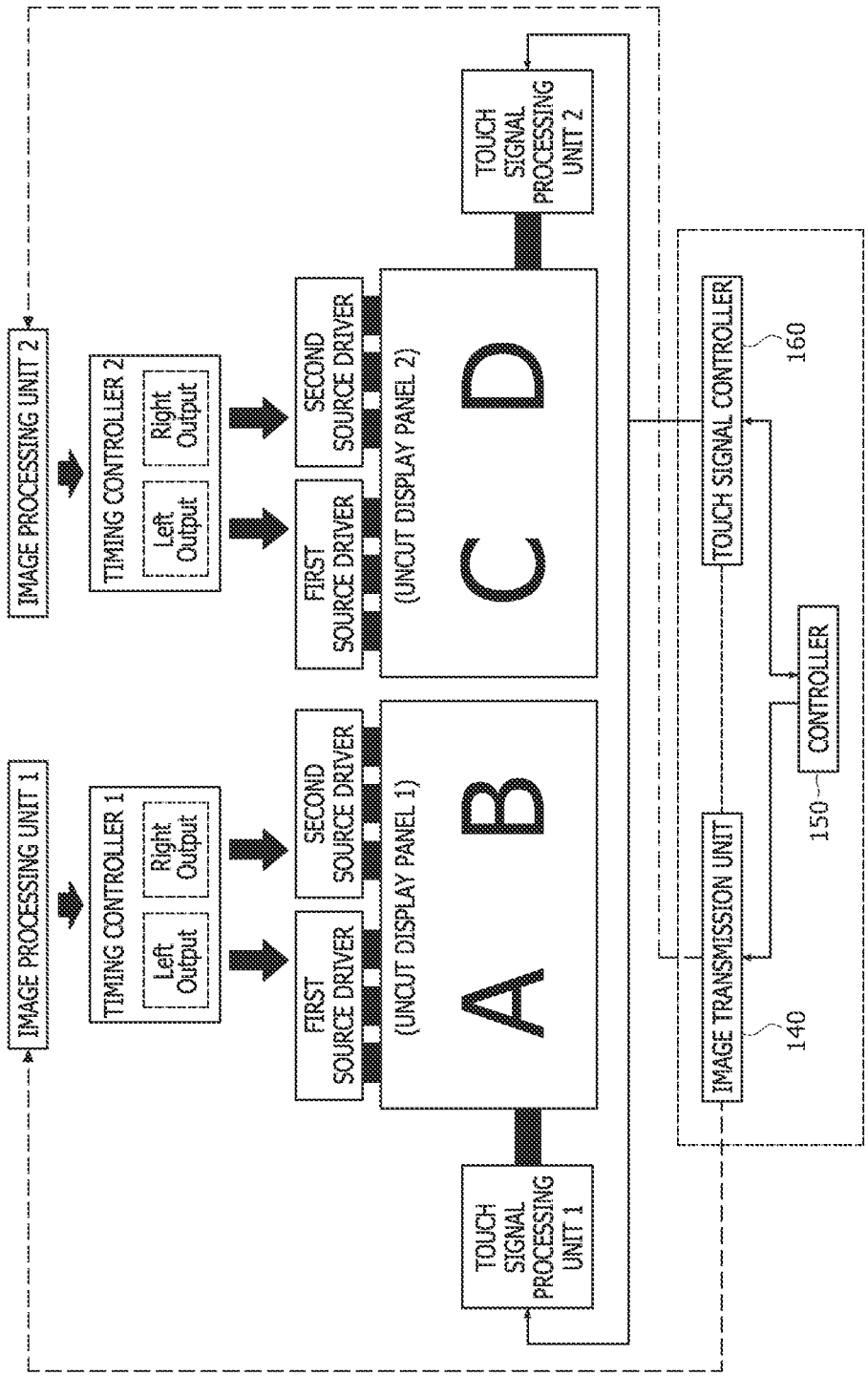
FIG. 8 is an exemplary diagram for describing a problem that arises when a display device is implemented using two conventional uncut display panels.
Figure 9:
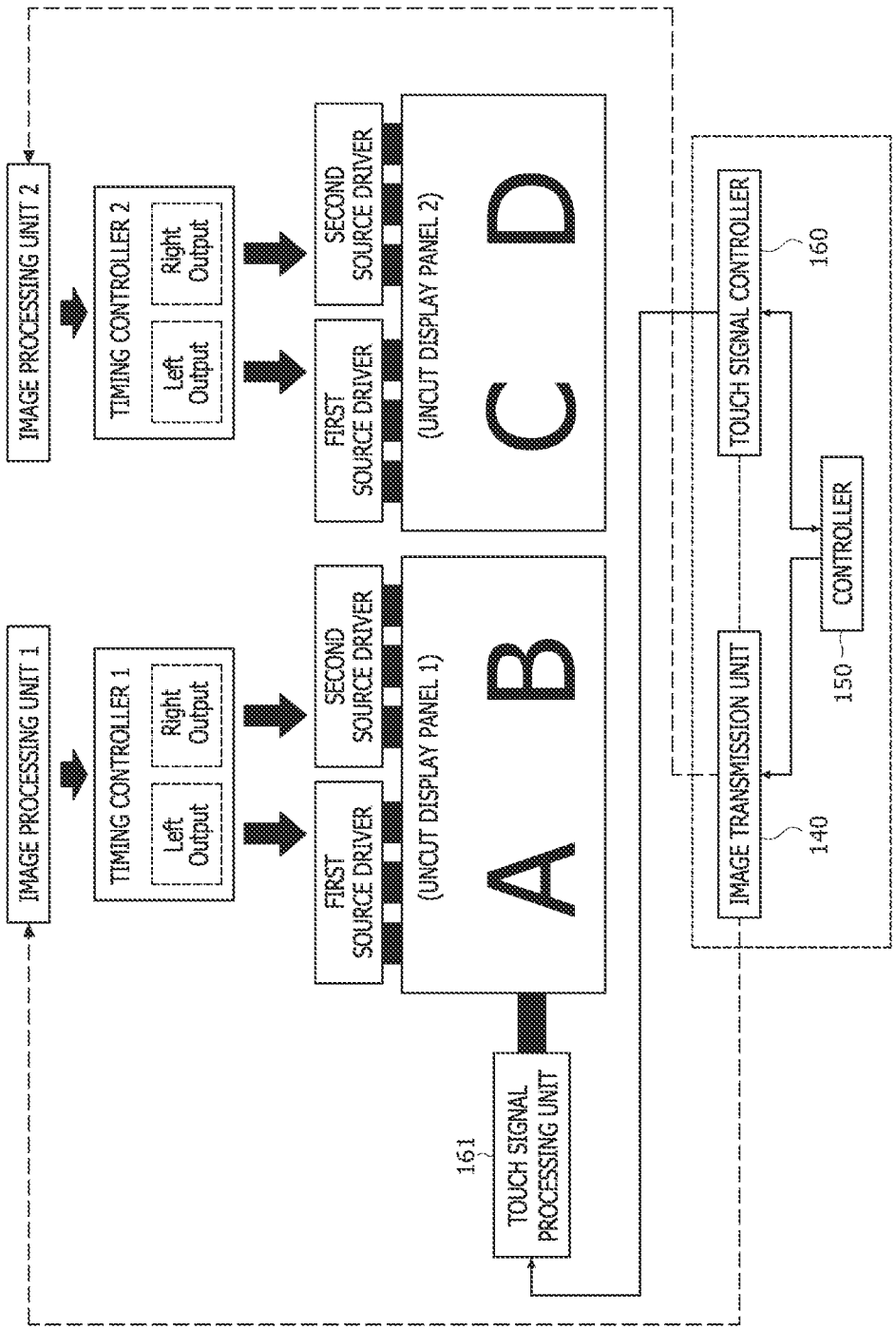
FIG. 9 is an exemplary diagram for describing a problem that arises when a display device is implemented using two conventional uncut display panels.

As another example, conventionally, as shown in FIGS. 8 and 9, when two display panels (uncut display panels) are disposed adjacent to each other, content images displayed on the two display panels (uncut display panels) disposed adjacent to each other operate as one, and a touch operation is performed in conjunction with this, generally, the display device is configured in a way in which a touch signal processing unit 1 and a touch signal processing unit 2 are respectively provided at the display panels (uncut display panels) as shown in FIG. 8, or in a way in which a touch signal processing unit is provided at only one display panel (uncut display panel) as shown in FIG. 9.

Accordingly, as shown in FIG. 8, when separate touch sensors are respectively attached to the two display panels (uncut display panels), there is a problem in that two image processing units (for example, an image processing unit 1 and an image processing unit 2) and two touch signal processing units (for example, the touch signal processing unit 1 and the touch signal processing unit 2) are necessary, an image input should be transmitted to each of the two image processing units (for example, the image processing unit 1 and the image processing unit 2), and in order to match the input of each touch sensor and the image displayed on the display panel like one image, in this regard, a separate driver to be installed in the controller 150 needs to be developed, and a lot of time and effort is needed for development because it is necessary to develop a driver to be driven for each operating system (OS).

Further, in the case of FIG. 9, when one touch sensor is configured to be attached to two display panels (uncut display panels), there is a problem in that two image processing units (for example, the image processing unit 1 and the image processing unit 2) and one touch signal processing unit 161 are necessary, an image input should be transmitted to each of the two image processing units (for example, the image processing unit 1 and the image processing unit 2), and in order to match the input of the touch sensor and the image displayed on the display device like one image, in this regard, a separate driver to be installed in the controller 150 needs to be developed, and a lot of time and effort is needed for development because it is necessary to develop a driver to be driven for each operating system (OS).

Figure 10:
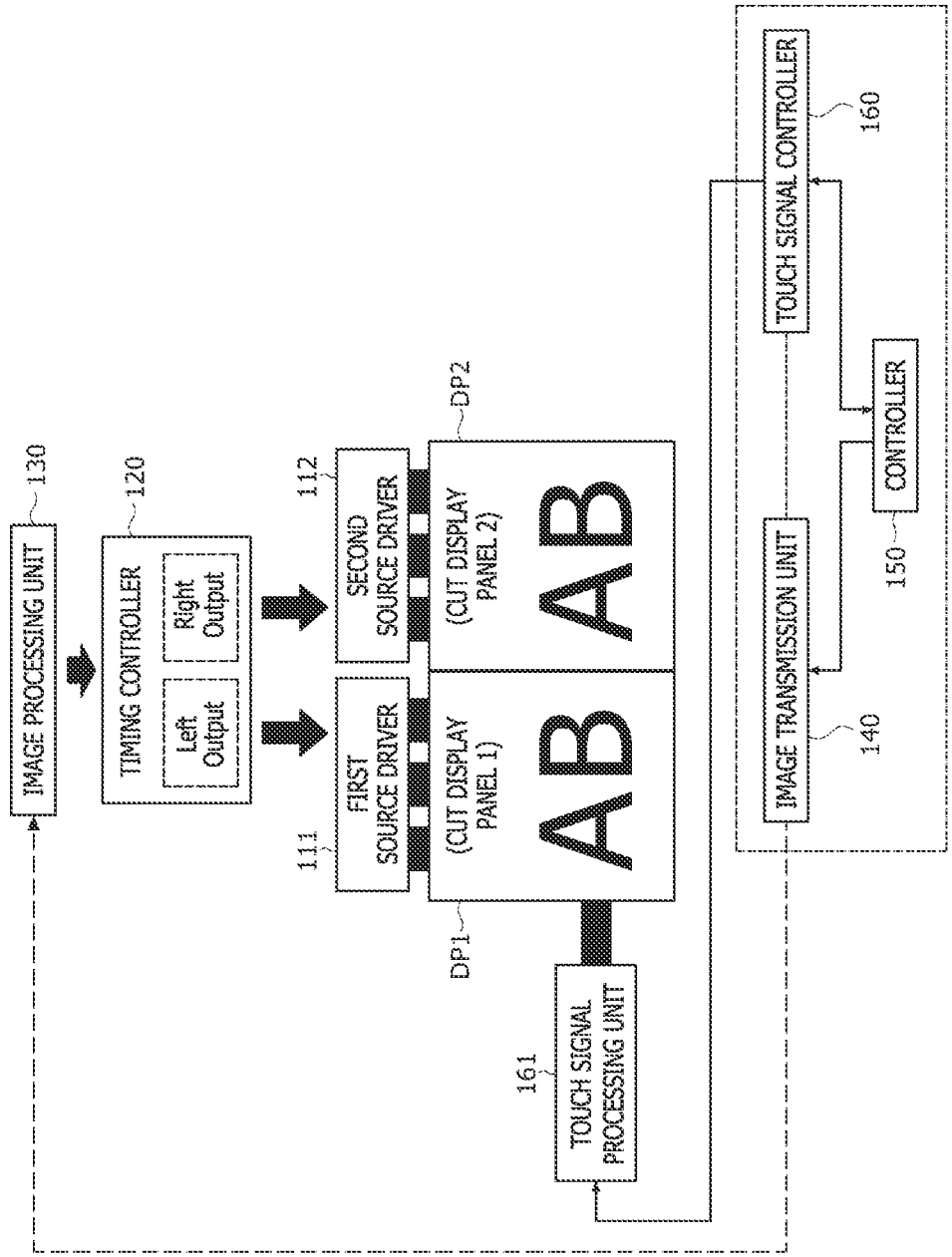
FIG. 10 is an exemplary diagram for describing an advantage in the case in which the display device is configured using two cut display panels made by cutting a single display panel according to one embodiment of the present invention.

On the other hand, in the embodiment, as shown in FIG. 10, when the display device is configured using two cut display panels DP1 and DP2 made by cutting a single display panel (uncut display panel) into right and left sides, since the display device may be configured using only one image processing unit 130 and one touch signal processing unit 161, and has the same configuration as a display device including one touch signal processing unit 161 in atypical display panel (uncut display panel), and thus development of a separate driver to be installed in the controller 150 may be omitted, there is an effect in that the configuration is simplified, and thus costs can be saved, and the time and money for developing a separate driver can be saved.

Meanwhile, the sensor unit 170 (171 to 174 in FIG. 11) includes a plurality of sensors for detecting the relative position and the posture (for example, the tilt) of each of the divided display panels DP1 and DP2

For example, the sensor unit 170 (171 to 174 in FIG. 11) includes a tilt sensor which detects the tilt or inclination angle according to the posture of each of the display panels DP1 and DP2, a proximity sensor for detecting a distance (interval) between cut surfaces (or corners) of the display panels DP1 and DP2, a magnetic force sensor, and the like.

Further, the sensor unit 170 (171 to 174 in FIG. 11) distinguishes a relative position (that is, a shape and an area of an overlapping portion) in the case in which the display panels DP1 and DP2 overlap at upper and lower sides, and the overlapping upper display panel and lower display panel.

For example, in the sensor unit 170 (171 to 174 in FIG. 11), sensors may be formed at (attached to) upper and lower side portions of each corner of the cut surface of each of the display panels DP1 and DP2.

Accordingly, the controller 150 calculates the shape and the area of the overlapping portion of the display panels DP1 and DP2 overlapping at the upper and lower sides (refer to FIGS. 11B to 11D) on the basis of location information where each of the sensors 171 to 174 of the sensor unit 170 is attached, length information of the cut surface of each of the display panels DP1 and DP2, tilt information (or inclination information) of each of the display panels DP1 and DP2, and relative position (or distance) information between the sensors 171 to 174 respectively attached to the corners.

The controller 150 performs control so that the image for each of the display panels DP1 and DP2 is displayed as it is through the image processing unit 130 without adjustment (that is, without scaling) when the cut surfaces of the cut display panels DP1 and DP2 are in close contact.

However, when the image for each of the display panels DP1 and DP2 is displayed as it is without adjustment (that is, without scaling) as described above, the position and the posture of each of the display panels DP1 and DP2 are tilted and thus the displayed images also appear tilted, and when the two display panels DP1 and DP2 overlap, the image displayed on the lower display panel may be partially obscured by the upper display panel and thus may be partially not visible.

Accordingly, in the embodiment, description for a case in which the cut surfaces of the display panels DP1 and DP2 are in close contact with each other, and are not tilted to one side as described above will be omitted.

However, when the cut surfaces of the divided display panels DP1 and DP2 are not in close contact with each other, and one side is tilted and thus the cut surfaces are spaced apart from each other (see FIGS. 11B and 11C), or the cut surfaces are processed into (disposed in) a form of partially overlapping at the upper and lower sides (see FIG. 11D), the controller 150 detects this, and thus the image of the portion hidden in the lower display panel (for example, DP1) may be displayed continuously on the upper display panel (for example, DP2) even when the lower display panel (for example, the DP1) is obscured by the upper display panel (for example, DP2), and the image displayed on each of the display panels DP1 and DP2 may be displayed in a straight manner without tilting even when each of the display panels DP1 and DP2 is tilted.

Meanwhile, in the embodiment, the controller 150 may respectively output images to the display panels DP1 and DP2 through the image processing unit 130. In this case, the images may be the same image or include different images.

Further, the controller 150 may control each of the display panels DP1 and DP2 through the image processing unit 130 to output the image to only one display panel.

For example, the image may be displayed only on the first display panel DP1 and the second display panel DP2 may be turned off, and conversely, the image may be displayed only on the second display panel DP2 and the first display panel DP1 may be turned off Here, a meaning of turning off the display panel includes a concept of outputting a black video (or an arbitrary image), or turning off a backlight unit (BLU) corresponding to the display panel.

FIG. 11D is an exemplary diagram illustrating a view viewed from above and a view viewed from the side when the display panels DP1 and DP2 separated from a single display panel partially overlap.

Hereinafter, as shown in FIGS. 11B to 11D, an operation of the controller 150, which detects a case in which at least one of the display panels DP1 and DP2 is tilted or partial regions are disposed in an overlapping form at the upper and lower sides when the divided display panels DP1 and DP2 are disposed and outputs a straight horizontal image, will be described in detail with reference to a flow chart in FIG. 12.

Figure 12:
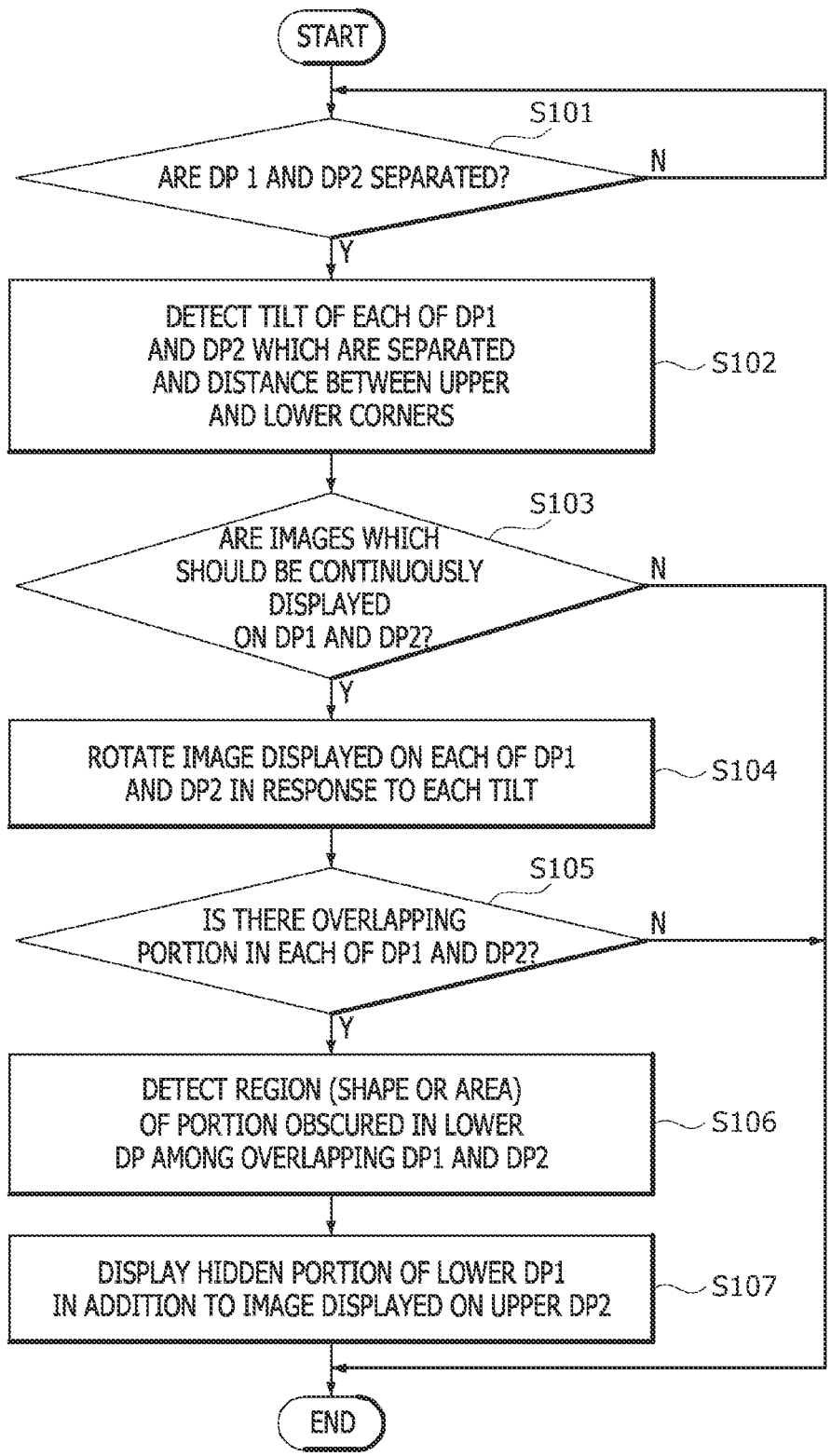
FIG. 12 is a flow chart for describing a display panel control method in FIG. 11.

FIG. 12 is a flow chart for describing a display panel control method in FIG. 11.

Referring to FIG. 12, a controller 150 checks whether cut surfaces of two display panels DP1 and DP2 physically cut from a single display panel are separated (that is, spaced apart from each other at a specific interval) through a sensor unit 170 (S101).

Further, the controller 150 detects the tilt of each of the separated display panels DP1 and DP2 and a distance between upper and lower corners (S102).

For example, the tilt of each of the display panels DP1 and DP2 and the distance (the interval) between the upper/lower corners are detected based on a virtual vertical line corresponding to the cut surfaces in the case in which the cut surfaces of the display panels DP1 and DP2 are horizontal with respect to the ground in a state of being in close contact with each other. Accordingly, whether the display panels DP1 and DP2 are rotated in place at a specific inclination, or the display panels DP1 and DP2 are spaced apart from each other at a specific distance (interval) and some portions overlap in a state in which the display panels DP1 and DP2 are rotated in place at the specific inclination can be seen.

Further, the controller 150 checks whether images to be respectively displayed on the separated display panels DP1 and DP2 are images that should be continuously displayed (that is, continuous images) (S103).

When the images to be respectively displayed on the separated display panels DP1 and DP2 are images that should be continuously displayed (that is, the continuous images) (Yes in S103), the controller 150 rotates the image displayed on (or to be displayed on) each of the separated display panels DP1 and DP2 in response to each tilt through an image processing unit 130.

For example, when the tilt of each of the separated display panels DP1 and DP2 is rotated 20 degrees, the controller 150 rotates the image displayed on (or to be displayed on) each display panel in an opposite direction by 20 degrees through the image processing unit 130 so that a horizontal image, which is not tilted, is shown to the user.

Further, the controller 150 checks whether there is an overlapping portion in each of the separated display panels DP1 and DP2 (S105).

For example, the separated display panels DP1 and DP2 may partially overlap in a state of being rotated at a specific inclination (see FIGS. 11B and 11C), or the separated display panels DP1 and DP2 may partially overlap in a state of not being rotated (see FIG. 11D).

Accordingly, when there is an overlapping portion in each of the separated display panels DP1 and DP2 (Yes in S105), the controller 150 detects (or calculates) a region (for example, a shape or an area) of the portion of the lower display panel (for example, DP1) obscured by the display panel (for example, DP2) (that is, the overlapping portion) among the overlapping display panels DP1 and DP2 (S106).

For example, the controller 150 calculates the shape and the area of the overlapping portion of the display panels DP1 and DP2 overlapping at the upper and lower sides on the basis of location information where sensors 171 to 174 of the sensor unit 170 are attached, length information of the cut surface of each of the display panels DP1 and DP2, tilt information (or inclination information) of each of the display panels DP1 and DP2, and relative position (or distance) information between the sensors 171 to 174 respectively attached to the corners.

When the shape and the area of the overlapping portion of the display panels DP1 and DP2 overlapping at the upper and lower sides are detected (or calculated) as described above, the controller 150 displays the image displayed on the hidden portion of the lower display panel (for example, DP1) in addition to a front portion of the image displayed on the upper display panel (for example, DP2) (that is, a front portion of the upper display panel corresponding to the hidden portion of the lower display panel) (S107).

As described above, in the embodiment, there is an effect in that a single display panel is cut into right and left sides to physically divide the display panel into a plurality of display panels, and then images are output by controlling the divided display panels, the images respectively displayed on the display panels DP1 and DP2 in response to relative positions and postures of the divided display panels are displayed to be connected and not discontinuous, and the image displayed on each display panel is displayed in a straight manner without tilting even when each of the display panels DP1 and DP2 is tilted.

Further, since the divided display panels are essentially one display panel, and thus a separate driving circuit for driving each display panel does not need to be provided, there is an effect in that costs can be saved due to simplification of the configuration, and the time and money for developing the separate driving circuit can be saved.

Further, in the embodiment, there is an effect in that various types of display devices can be implemented by disposing the physically cut display panels, and the region where the screen of the display device is not displayed can be downsized while reducing costs, and usability can be improved by respectively outputting different images to the physically cut display panels.

Although embodiments of the present invention is described above with reference to the embodiments shown in the drawings, this is only exemplary, and it should be understood that various modifications and equivalent embodiments may be made by those skill in the conventional art. Accordingly, the technical scope of embodiments of the present invention should be defined by the claims. Further, implementations described in the present specification may be implemented as, for example, as a method or process, device, software program, data stream, or signal. Although only the context of a singular form of implementation is discussed (for example, only a method is discussed), implementation of discussed features may also be implemented in another form (for example, a device or program). The device may be implemented with appropriate hardware, software, firmware, and the like. In embodiments, the method may be implemented in a device such as a computer, microprocessor, processor, which generally refers to a processing device including an integrated circuit, a programmable logic device, or the like. The processor also includes communication devices such as a computer, a cell phone, a personal digital assistant (PDA), other devices and the like, which facilitate communication of information between final users.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A display panel control device comprising:
two display panels (DP1 and DP2) generated by physically cutting a single display panel into right and left sides;
an image processing unit configured to output images to each of the physically cut display panels (DP1 and DP2);
a sensor unit with a plurality of sensors configured to detect a relative position and a posture of each of the display panels (DP1 and DP2); and
a controller,
wherein the controller is configured to:
check whether cut surfaces of the two display panels (DP1 and DP2) cut from the single display panel into right and left sides are separated and spaced apart from each other through the sensor unit,
detect a tilt of each of the separated display panels (DP1 and DP2) and a distance between upper and lower corners,
calculate the relative position and the posture on the basis of a cut surface of each of the display panels (DP1 and DP2) using information on the tilt and the distance between the upper and lower corners, and
process each image to be displayed in response to the relative position and the posture of each of the display panels (DP1 and DP2);
wherein the controller rotates the image to be displayed on each of the separated display panels (DP1 and DP2) in response to each tilt when the images to be displayed on the display panels (DP1 and DP2) which are separated and spaced apart from each other are continuous images that are continuously displayed.

2. The display panel control device of claim 1, wherein the single display panel includes a display panel including at least two pairs of source drivers and gate drivers so that the display panel is divided into right and left regions and each region is driven.

3. The display panel control device of claim 1, wherein cut portions of the cut display panels (DP1 and DP2) are disposed adjacent to each other so that a region where a screen is not displayed (BM: black mask) is reduced to allow a slim design when the cut display panels (DP1 and DP2) are implemented as one display device.

4. The display panel control device of claim 1, wherein when the cut display panels (DP1 and DP2) are disposed adjacent to each other and implemented as one display device, different curvatures are applied to each of the display panels (DP1 and DP2) to be physically implemented as various types of display devices.

5. The display panel control device of claim 1, wherein when the cut display panels (DP1 and DP2) are disposed adjacent to each other and implemented as one display device, in order to reduce components compared to a case in which a display device is implemented using a plurality of uncut display panels, the image processing unit controls the cut display panels (DP1 and DP2) by commonly using components included in one uncut display panel cut into the cut display panels (DP1 and DP2).

6. The display panel control device of claim 1, wherein:
a touch film, which is not physically separated, is attached to an upper portion of each of the display panels (DP1 and DP2); and
the display panel control device further comprises one touch signal processing unit configured to detect and process a touch on each of the display panels (DP1 and DP2) through the touch film, which is not physically separated.

7. The display panel control device of claim 1, wherein when the two display panels (DP1 and DP2) cut from the single display panel partially overlap at upper and lower sides, the controller calculates a shape and an area of an overlapping portion, and distinguishes the overlapping upper display panel and lower display panel through the sensor unit.

8. A display panel control method comprising:
controlling, by an image processing unit, display panels (DP1 and DP2) physically cut from a single display panel;
displaying, by the image processing unit, an image on each of the display panels (DP1 and DP2);
wherein in order to display the image to be displayed on each of the display panels (DP1 and DP2), the method further comprises:
checking, by a controller, whether cut surfaces of the display panels (DP1 and DP2) cut from the single display panel into right and left sides are separated and spaced apart from each other through a sensor unit;
detecting, by the controller, a tilt of each of the separated display panels (DP1 and DP2) and a distance between upper and lower corners;
calculating, by the controller, a relative position and a posture on the basis of a cut surface of each of the display panels (DP1 and DP2) using information on the tilt and the distance between the upper and lower corners; and
processing, by the controller, each image to be displayed in response to the relative position and the posture of each of the display panels (DP1 and DP2);
wherein in the processing of each image to be displayed in response to the relative position and the posture of each of the display panels (DP1 and DP2), the method further includes rotating, by the controller, the image to be displayed on each of the separated display panels (DP1 and DP2) in response to each tilt through the image processing unit when the images to be displayed on the separated display panels (DP1 and DP2) are images that are continuously displayed.

9. The display panel control method of claim 8, wherein the single display panel includes a display panel including at least two pairs of source drivers and gate drivers so that the display panel is divided into right and left regions and each region is driven.

10. The display panel control method of claim 8, wherein:
a touch film, which is not physically separated, is attached to an upper portion of each of the display panels (DP1 and DP2); and
one touch signal processing unit detects and processes a touch on each of the display panels (DP1 and DP2) through the touch film, which is not physically separated.

11. The display panel control method of claim 8, wherein in order to process each image to be displayed, the controller calculates a shape and an area of an overlapping portion in the case in which the display panels partially overlap at upper and lower sides, and distinguishes the overlapping upper display panel and lower display panel.

* * * * *